United States Patent
Taylor

(10) Patent No.: US 7,738,389 B1
(45) Date of Patent: *Jun. 15, 2010

(54) SYSTEM AND METHOD FOR MULTIPLE TEST ACCESS IN A COMMUNICATION NETWORK

(75) Inventor: William S Taylor, Duluth, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 775 days.

This patent is subject to a terminal disclaimer.

(21) Appl. No.: 11/610,960

(22) Filed: Dec. 14, 2006

Related U.S. Application Data

(63) Continuation of application No. 10/136,080, filed on May 1, 2002, now Pat. No. 7,190,677.

(51) Int. Cl.
*G01R 31/08* (2006.01)
(52) U.S. Cl. .................................. 370/251; 370/468
(58) Field of Classification Search .................. None
See application file for complete search history.

(56) References Cited

U.S. PATENT DOCUMENTS 5,954,829 A 9/1999 McLain, Jr. et al.
6,005,696 A * 12/1999 Joline et al. ................ 398/25
7,190,677 B2 * 3/2007 Taylor ........................ 370/241
2004/0078717 A1 * 4/2004 Allred et al. ................ 714/43

* cited by examiner

*Primary Examiner*—Duc C Ho
(74) *Attorney, Agent, or Firm*—Hanley, Flight & Zimmerman, LLC.

(57) ABSTRACT

A method of providing multiple test access for test equipment in a communication network is provided. The method comprises the step of coupling test apparatus to a first communication line via a first communication circuit in the test apparatus wherein the first communication line has a first quantity of equal bandwidth communication pathways that are dedicated for test access. The first communication line is coupled to a first cross connect apparatus. The test apparatus also has a second communication circuit that is coupled to the first communication circuit. The method further comprises the step of utilizing a second communication line having a second quantity of equal bandwidth communication pathways that are dedicated for test access. The second communication line is coupled between the first cross connect apparatus and a second cross connect apparatus. The second quantity is less than the first quantity. The method further comprises the step of controlling the test apparatus to initiate a test procedure wherein the second communication circuit initiates a test of network facilities associated with the second cross connect apparatus.

20 Claims, 4 Drawing Sheets

SYSTEM AND METHOD FOR MULTIPLE TEST ACCESS IN A COMMUNICATION NETWORK

This application is a continuation of pending U.S. patent application Ser. No. 10/136,080, filed on 1 May 2002, and entitled "System and Method for Multiple Test Access in a Communication Network".

The contents of this previous application are incorporated by this reference as if set forth verbatim herein. The Applicant claims the benefit of the filing date of this previous application to the fullest extent permitted under 35 U.S.C. §120.

BACKGROUND

1. Field of the Invention

This invention relates generally to telecommunication networks. More particularly, the invention relates to a system and method for testing network elements in a telecommunications network.

2. Description of the Related Art

Many transport circuits, sub-circuits, and components in telecommunication networks are tested using test equipment such as the Acterna T3AS test equipment. The test equipment can be controlled to provide test signals to test the functioning of physical or virtual communication channels serviced by a digital cross connect system ("DCS") to which the test equipment is coupled. The test equipment typically comprise a plurality of communication circuits wherein each communication circuit is used to communicate with a different DCS. Each communication circuit is directly coupled to a separate communication line that has multiple sub-lines such as a DS3 carrier having multiple T1 lines. When connected to a DS3 carrier, the communication circuits in the test equipment typically only utilize a small portion of the available T1 lines and as a result a large number of the available T1 lines are unused by each communication circuit.

SUMMARY

A method of providing multiple test access for test equipment in a communication network is provided. The method comprises the step of coupling test apparatus to a first communication line via a first communication circuit in the test apparatus wherein the first communication line has a first quantity of equal bandwidth communication pathways that are dedicated for test access. The first communication line is coupled to a first cross connect apparatus. The test apparatus also has a second communication circuit that is coupled to the first communication circuit. The method further comprises the step of utilizing a second communication line having a second quantity of equal bandwidth communication pathways that are dedicated for test access. The second communication line is coupled between the first cross connect apparatus and a second cross connect apparatus. The second quantity is less than the first quantity. The method further comprises the step of controlling the test apparatus to initiate a test procedure wherein the second communication circuit initiates a test of network facilities associated with the second cross connect apparatus.

In accordance with another aspect of the invention described by the claims, a test apparatus for use in a communication network having a plurality of cross connect apparatus is provided. The test apparatus comprises a first communication circuit and a second communication circuit. The first communication circuit has an associated first communication port. The first port is capable of coupling with a communication line having multiple communication pathways. The test apparatus is controllable to test a first transport circuit in the communication network that is accessible via a first cross connect apparatus. The first cross connect apparatus is accessible via the first port and a first communication line having a first quantity of equal bandwidth communication pathways that are dedicated for test access. The first communication line is coupled between the first cross connect apparatus and the first port.

The second communication circuit has an associated second communication port. The second port is capable of coupling with a communication line having multiple communication pathways. The test apparatus is controllable to test a second transport circuit in the communication network that is accessible via a second cross connect apparatus. The second cross connect apparatus is accessible via the second port and a second communication line having a second quantity of equal bandwidth communication pathways that are dedicated for test access. The second communication line is coupled between the first cross connect apparatus and the second cross connect apparatus. The second quantity is less than the first quantity. The second port is coupled to an input of the first communication circuit. Some of the first quantity of equal bandwidth communication pathways are used by the second port and second communication circuit in connection with the testing of the second transport circuit.

In accordance with another aspect of the invention defined by the claims, a communication network is provided. The communication network comprises a first cross connect apparatus, a second cross connect apparatus, a first communication line, a second communication line, and a test apparatus. The first communication line has a first quantity of equal bandwidth communication pathways that are dedicated for test access. The first communication line is coupled at one end to the first cross connect apparatus. The second communication line has a second quantity of equal bandwidth communication pathways that are dedicated for test access. The second communication line is coupled between the first cross connect apparatus and the second cross connect apparatus. The second quantity is less than the first quantity.

The test apparatus has a first communication circuit with a first communication port and a second communication circuit with a second communication port. Each of the first and second ports are capable of coupling with a communication line having multiple communication pathways. The test apparatus is controllable to test a first transport circuit that is accessible via the first cross connect apparatus. The first cross connect apparatus is accessible via the first port. The test apparatus is also controllable to test a second transport circuit that is accessible via the second cross connect apparatus. The second cross connect apparatus is accessible via the second port. The first port is coupled to the first communication line and the second port is coupled to an input of the first communication circuit. Some of the first quantity of equal bandwidth communication pathways are used in connection with the testing of the second transport circuit.

BRIEF DESCRIPTION OF THE DRAWINGS

In order that the invention identified in the claims may be more clearly understood, preferred embodiments of structures, systems and methods having elements corresponding to elements of the invention recited in the claims will be described in detail by way of example, with reference to the accompanying drawings, in which:

DETAILED DESCRIPTION

Figure 1:
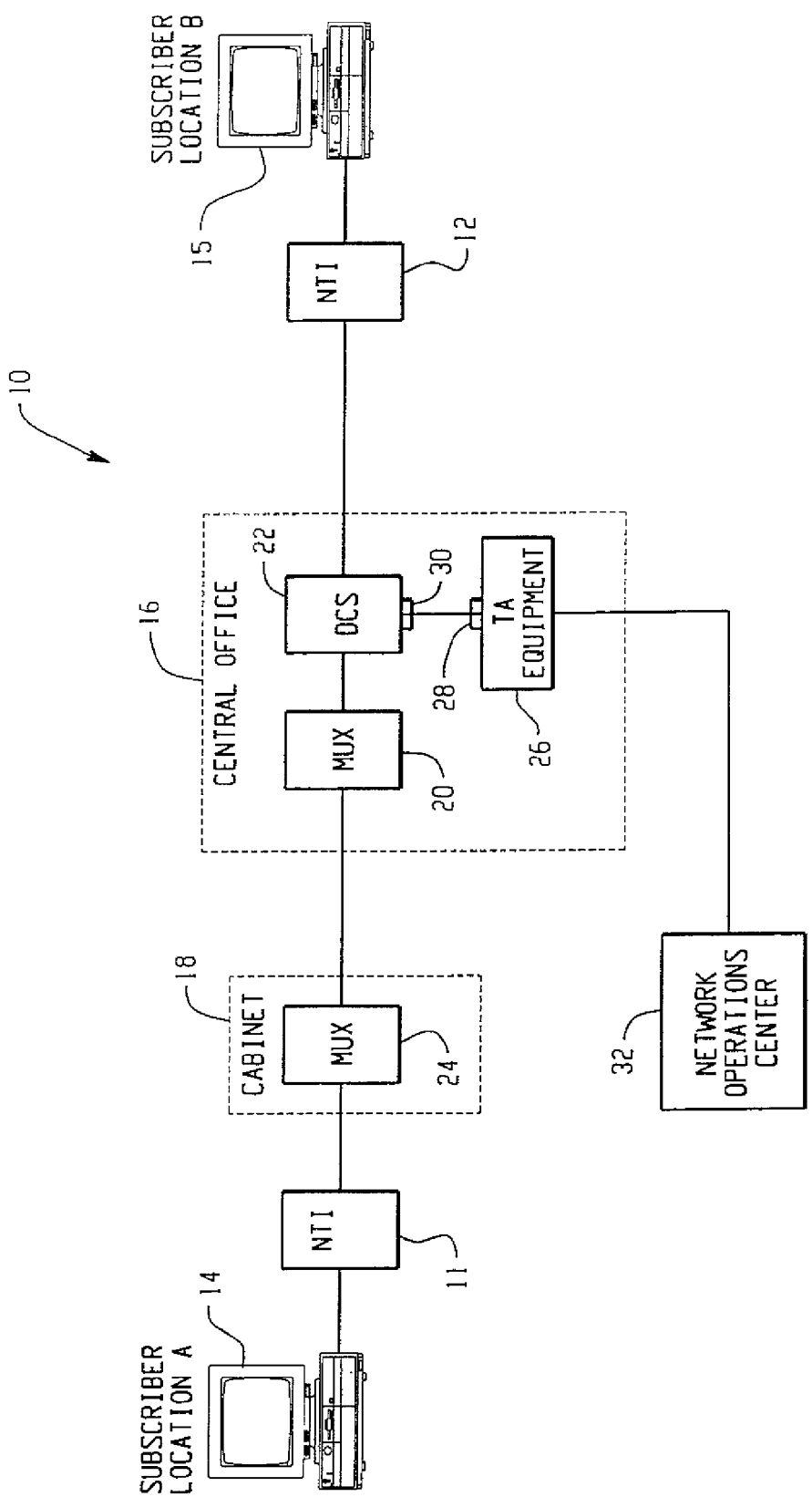
FIG. 1 is a schematic diagram of an exemplary section of a Local Access and Transport Area network having test access equipment.

Referring now to the drawings, shown in FIG. 1 is an exemplary section of a Local Access and Transport Area ("LATA") network 10 that provides a transport circuit for communication between two locations, subscriber location A and subscriber location B. In the illustrated example, the transport circuit provides a subscriber at subscriber location A with a first subscriber network termination interface ("NTI") 11 and a subscriber at subscriber location B with a second subscriber NTI 12. Coupled to each NTI 11, 12, a subscriber may have various types of customer premises equipment ("CPE") 14, 15 such as conventional telephones, facsimile machines, private branch exchanges, voice mail systems, key telephone systems, computers, modems, telephone answering machines, alarm systems, and radio control systems, as well as many other devices.

Coupled between each NTI 11, 12 in the exemplary LATA network section 10, are a central office ("CO") 16 and a field cabinet 18, each of which includes various types of network elements for allowing the CPE 14, 15 at each end of the LATA network section 10 to communicate with each other and other CPE (not shown). Examples of network elements located at the CO 16 include Multiplexers ("MUXs") 20, digital cross-connect systems ("DCS") 22, and other equipment. Examples of network elements that may reside in the cabinet 18 include coder/decoder (codec) equipment, multiplexers ("MUXs") 24, line interface units ("LIUs"), Optical network units ("ONUs"), digital loop carrier ("DLC") equipment, HDSL Line Units ("HLUs"), HDSL Remote Units ("HRUs"), and others.

To test the various components and sub-circuits that cooperate to faun the LATA network section 10 between the CPE 14, 15 at each end of the network section, test access ("TA") equipment 26 is provided. An exemplary test access equipment model is the Acterna T3A3 test access equipment. Other test access equipment exists. The TA equipment 26 comprises a number of elements including one or more communication ports 28. Preferably the communication ports 28 are facility access digroup ("FAD") interfaces or ports 28 that can be coupled to a FAD interface or port 30 on a DCS 22. Alternatively, the communication ports 28 could be test access digroup ("TAD") interfaces or ports or other types of interfaces or ports that can be coupled to a TAD interface or port 30 on a DCS 22 or other type of port on a DCS. The TA equipment 26 can be controlled, preferably from a network operations center 32, to provide test signals to test the functioning of each physical or virtual communication channel or transport circuit serviced by the DCS 22 to which the TA equipment 26 is coupled via the communication port 28. The TA equipment 26, for example, can test the end-to-end functioning of the LATA network section 10 between the NTIs 11, 12 at either end of the LATA network section 10.

Figure 2:
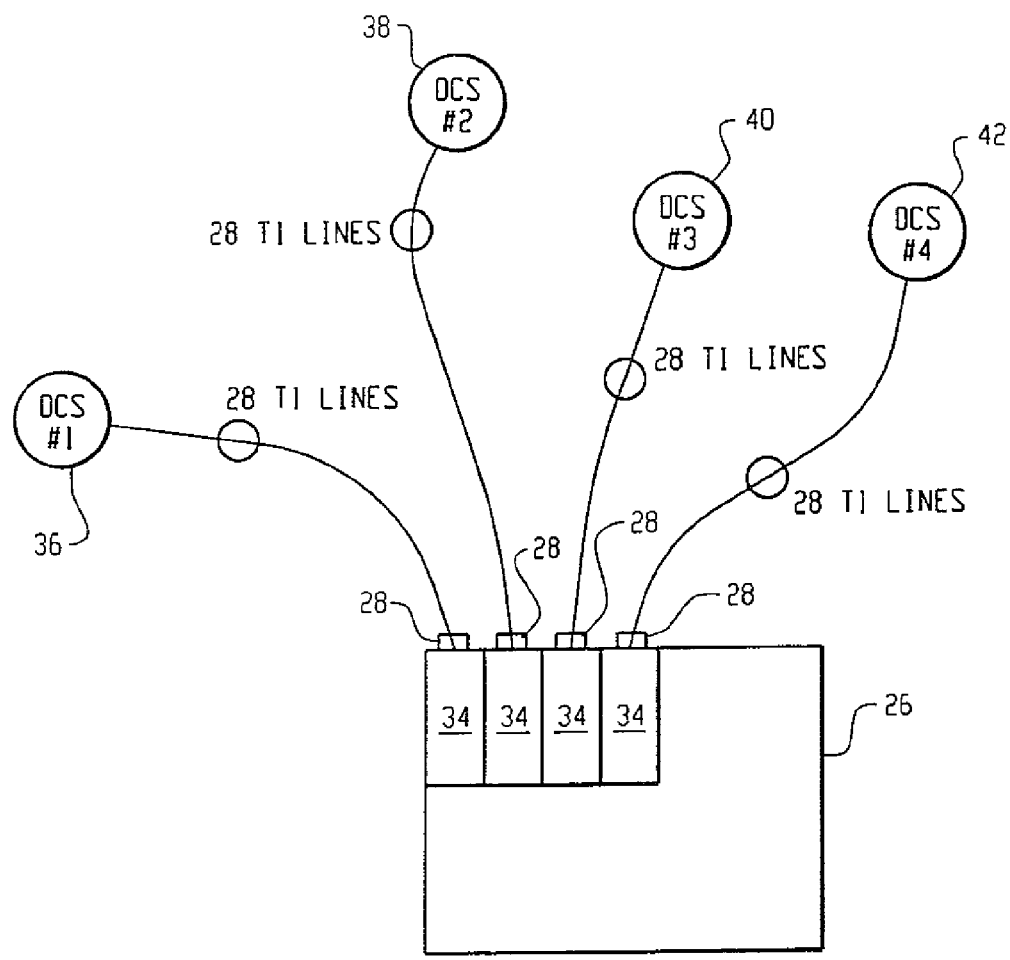
FIG. 2 is a block diagram illustrating a current way of connecting test access equipment to multiple DCSs in a telecommunication network.

As illustrated in FIG. 2, the TA equipment 26 preferably comprises a plurality of communication circuits 34, which preferably are FAD or TAD circuits, each having a communication port 28, which preferably is a FAD or TAD port, for coupling to a different DCS 36, 38, 40, 42. A separate communication circuit 34 is needed to test transport circuits serviced by each DCS. Each communication circuit 34 is typically used to test the transport circuits serviced by a single DCS. To provide the TA equipment 26 with the capability of interfacing with and testing the transport circuits serviced by multiple DCSs, multiple communication circuits 34 are typically provided.

To test various transport circuits serviced by a DCS, it is often necessary to conduct a number of tests simultaneously. Each test typically requires the use of a separate pair of communication pathways (one transmit and one receive pathway). Therefore to perform the multiple simultaneous tests, multiple pairs of communication pathways are needed to couple the TA equipment 26 to the DCS.

Commonly, DS3 lines are used to couple the TA equipment to the DCS because a DS3 line contains multiple DS1 or T1 communication pathways. Consequently, the communication circuits 34 provided in the TA equipment 26 are commonly DS3 communications circuits that are capable of coupling to and communicating over DS2 lines. A DS3 line contains the equivalent of 28 T1 lines and therefore can provide 14 pairs of communication pathways (each pair comprising one transmit and one receive pathway) between a communication circuit 34 and a DCS.

In actual usage, the maximum number of simultaneous test that are conducted at any one time in connection with a single DCS is four (4). Therefore, a communication or FAD circuit 34 is not known to use more than 4 pairs of (or 8 total DS1) communication pathways at a given time. Consequently, 10 pairs of communication pathways or 20 T1 lines are not utilized if a DS3 line and a DS3 communication circuit is used with the TA equipment. A DCS, therefore, must dedicate 20 T1 lines to the TA equipment 26 that go unused. The DCS cannot use those 20 unused T1 lines to support paying customers.

Figure 3:
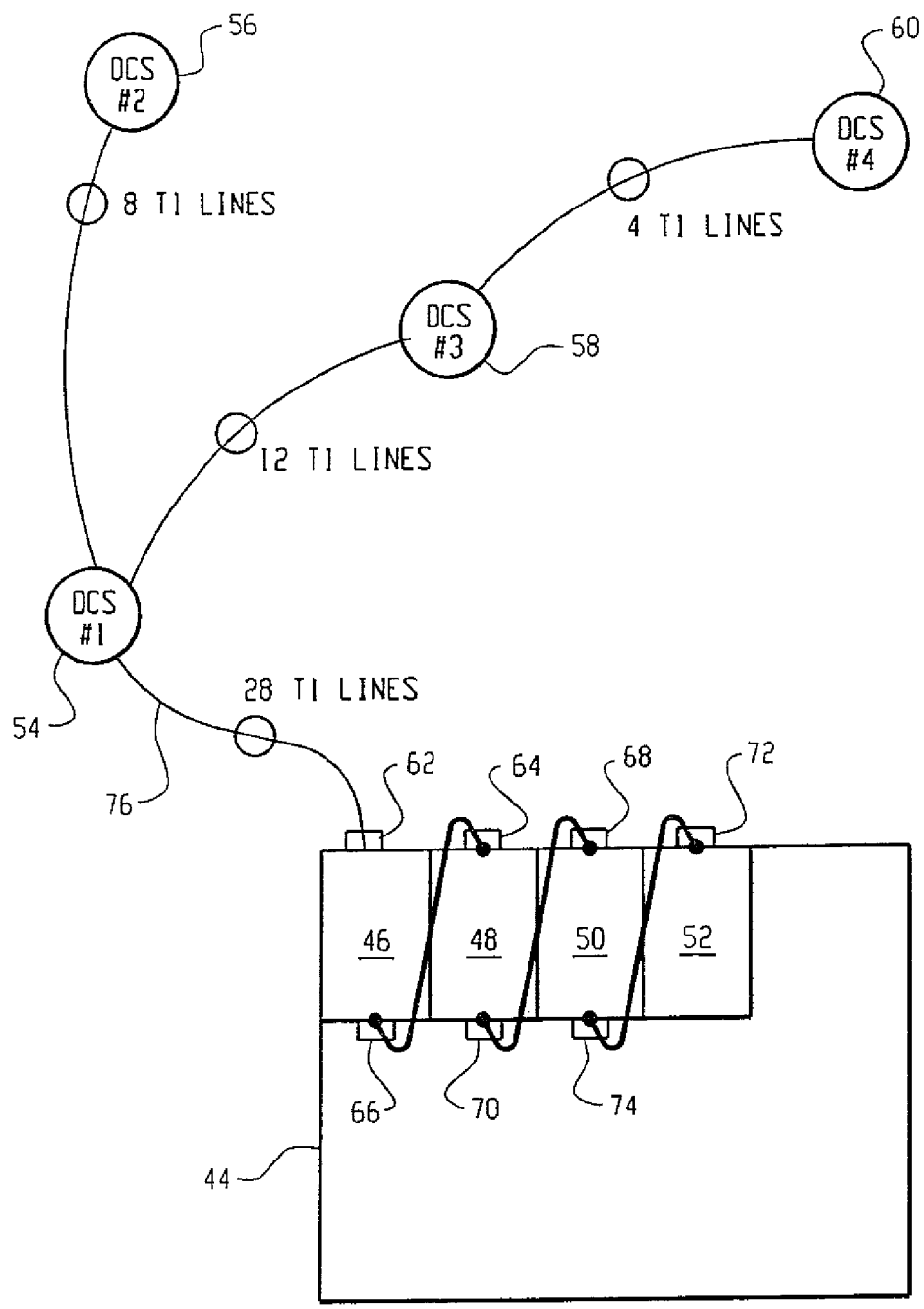
FIG. 3 is a block diagram illustrating a preferred way of connecting test access equipment to multiple DCSs in a telecommunication network.

A preferred TA equipment 44 arrangement is illustrated in FIG. 3. The exemplary TA equipment 44, is equipped with 4 FAD circuits 46, 48, 50, 52 for providing testing functions to transport circuits associated with 4 different DCSs 54, 56, 58, 60, wherein one FAD circuit is associated with each DCS 54, 56, 58, 60. The TA equipment 44, however, could be equipped with fewer or more communication circuits.

In the illustrated example, the FAD circuits 46, 48, 50, 52 are daisy chained together. The upstream FAD port 62 of the first FAD circuit 46 is coupled to a DS3 line connected to DCS #1 54. The upstream FAD port 64 of a second FAD circuit 48 is coupled to the downstream FAD port 66 of the first FAD circuit 46. The upstream FAD port 68 of a third FAD circuit 50 is coupled to the downstream FAD port 70 of the second FAD circuit 48. The upstream FAD port 72 of a fourth FAD circuit 52 is coupled to the downstream FAD port 74 of the third FAD circuit 50. This arrangement allows the FAD circuits 46, 48, 50, 52 to share a common DS3 line 76 to DCS #1 54.

Each FAD circuits 46, 48, 50, 52 can use some of the T1 lines associated with the common DS3 line 76. The FAD circuits can gain access to their associated DCS through T1 lines that interconnect the DCSs in the network. As a result of the new arrangement, the total number of dedicated, unused T1 lines in the network can be reduced. The first DCS 54 continues to dedicate a DS3 line to the TA equipment 44. But, the remaining DCSs 56, 58, 60 do not have to dedicate a DS3 line. These DCSs 56, 58, 60 can dedicate fewer T1 lines and have more T1 lines available to use with paying customers.

Figure 4:
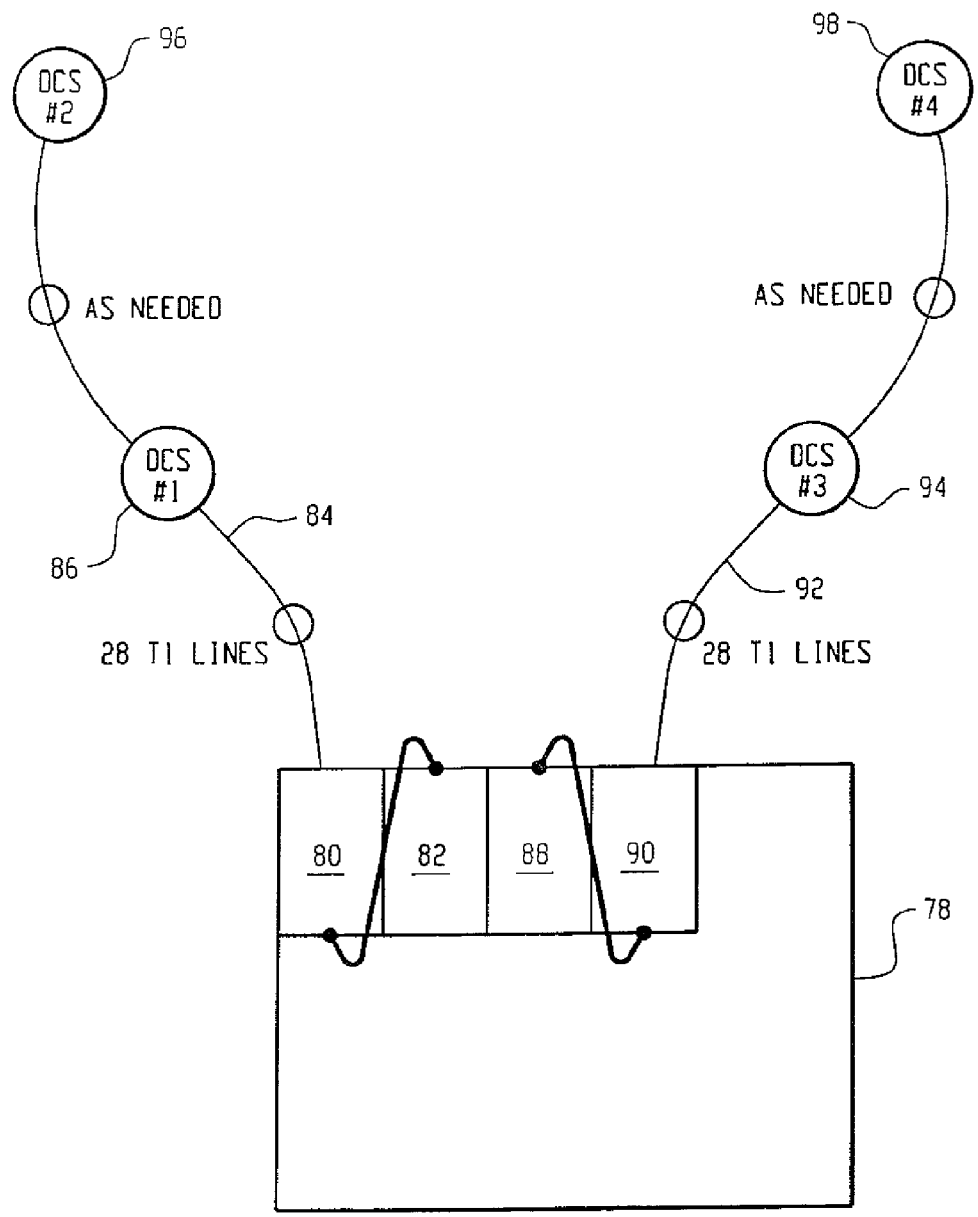
FIG. 4 is a block diagram illustrating another exemplary way of connecting test access equipment to multiple DCSs in a telecommunication network.

Illustrated in FIG. 4 is another improved TA equipment 78 arrangement. In this example, the first two FAD circuits 80, 82 are coupled together and share a first common DS3 line 84 to a first DCS 86. The next two FAD circuits 88, 90 are coupled together and share a second common DS3 line 92 to a third DCS 94. In this arrangement, the second FAD circuit 82 can gain access to the second DCS 96 through the first common DS3 line 84 and the first DCS 86. The third FAD circuit 88 can gain access to the fourth DCS 98 through the second common DS3 line 92 and the third DCS 94. In this arrangement, the first and third DCSs 86 and 94 must each dedicate a DS3 line to the TA equipment 78. But, the second and fourth DCSs only need to dedicate T1 lines as needed.

Theses are just a few examples of improved TA equipment arrangements. Other variations from these systems and methods should become apparent to one of ordinary skill in the art without departing from the scope of the invention defined by the claims. The embodiments have been described herein with reference to a LATA network but are also applicable to other types of networks such as a frame relay network. The embodiments have been described herein with reference to a FAD circuit and FAD port but are also applicable to other types of communication circuits and ports such as a TAD circuit and a TAD port.

The embodiments described herein and shown in the drawings are examples of structures, systems or methods having elements corresponding to the elements of the invention recited in the claims. This written description and drawings may enable those skilled in the art to make and use embodiments having alternative elements that likewise correspond to the elements of the invention recited in the claims. The intended scope of the invention thus includes other structures, systems or methods that do not differ from the literal language of the claims, and further includes other structures, systems or methods with insubstantial differences from the literal language of the claims.

The following is claimed:

1. A test apparatus for use in a communication network having a plurality of cross connect apparatus, the test apparatus comprising:
   a first facilities access digroup (FAD) circuit that includes a port for coupling with a first communication line having multiple communication pathways, the first communication line being coupled to a first cross connect apparatus, the first communication line having a first quantity of equal bandwidth communication pathways that are dedicated for test access; and
   a second FAD circuit that includes a port for coupling to the first FAD circuit, the second FAD circuit to communicate with a second cross connect apparatus that is coupled to the first cross connect apparatus by a second communication line having multiple communication pathways, and the second communication line having a second quantity of equal bandwidth communication pathways that are dedicated for test access, the second FAD circuit to communicate with the second cross connect apparatus using at least one of the first quantity of equal bandwidth communication pathways; and
   wherein the test apparatus is controllable is to initiate a test sequence wherein the second FAD circuit initiates a test of transport circuits associated with the second cross connect apparatus.

2. The test apparatus of claim 1, wherein the second FAD circuit is coupled to the first FAD circuit.

3. The test apparatus of claim 1, wherein the second quantity is less than the first quantity.

4. The test apparatus of claim 1 wherein the first FAD circuit is a DS3 FAD circuit.

5. The test apparatus of claim 1, wherein the second FAD circuit is a DS3 FAD circuit.

6. The test apparatus of claim 1, further comprising a third FAD circuit, the third FAD circuit being coupled to the second FAD circuit, the third FAD circuit to communicate with a third cross connect apparatus that is coupled to either the first cross connect apparatus or the second cross connect apparatus by a third communication line having a third quantity of equal bandwidth communication pathways that are dedicated for test access, the third FAD circuit to communicate with the third cross connect apparatus using some of the first quantity of equal bandwidth communication pathways, and wherein the test apparatus is controllable to initiate a test sequence wherein the third FAD circuit initiates a test of transport circuits associated with the third cross connect apparatus.

7. The test apparatus of claim 6, wherein the first FAD circuit, the second FAD circuit and the third FAD circuit are DS3 FAD circuits.

8. The test apparatus of claim 6, wherein the third quantity is less than the first quantity.

9. A test apparatus for use in a communication network having a plurality of cross connect apparatus, the test apparatus comprising:
   a first test access digroup (TAD) circuit that includes a port for coupling with a first communication line having multiple communication pathways, the first communication line being coupled to a first cross connect apparatus, the first communication line having a first quantity of equal bandwidth communication pathways that are dedicated for test access; and
   a second TAD circuit that includes a port for coupling to the first TAD circuit, the second TAD circuit to communicate with a second cross connect apparatus that is coupled to the first cross connect apparatus by a second communication line having multiple communication pathways, and the second communication line having a second quantity of equal bandwidth communication pathways that are dedicated for test access, the second TAD circuit to communicate with the second cross connect apparatus using at least one of the first quantity of equal bandwidth communication pathways; and
   wherein the test apparatus is controllable to initiate a test sequence, and wherein the second TAD circuit initiates a test of transport circuits associated with the second cross connect apparatus.

10. The test apparatus of claim 9, wherein the second TAD circuit is coupled to the first TAD circuit.

11. The test apparatus of claim 9, wherein the second quantity is less than the first quantity.

12. The test apparatus of claim 9, wherein the first TAD circuit is a DS3 TAD circuit.

13. The test apparatus of claim 9, wherein the second TAD circuit is a DS3 TAD circuit.

14. The test apparatus of claim 9, further comprising a third TAD circuit, the third TAD circuit including a port for coupling to the second TAD circuit, the third TAD circuit to communicate with a third cross connect apparatus that is coupled to either the first cross connect apparatus or the second cross connect apparatus by a third communication line having a third quantity of equal bandwidth communication pathways that are dedicated for test access, the third TAD circuit to communicate with the third cross connect apparatus using at least one of the first quantity of equal bandwidth communication pathways, and wherein the test apparatus is controllable to initiate a test sequence, wherein the third TAD circuit initiates a test of transport circuits associated with the third cross connect apparatus.

15. The test apparatus of claim 14, wherein the first TAD circuit, the second TAD circuit and the third TAD circuit are DS3 TAD circuits.

16. A test apparatus for use in a communication network having a plurality of cross connect apparatus, the test apparatus comprising:
    a first communication circuit having a first communication port, the first port for coupling with a communication line having multiple communication pathways, the test apparatus being controllable to test a first transport circuit in the communication network that is accessible via a first cross connect apparatus, wherein the first cross connect apparatus is accessible via the first port and a first communication line having a first quantity of equal bandwidth communication pathways that are dedicated for test access, the first communication line being coupled between the first cross connect apparatus and the first port; and
    a second communication circuit with a second communication port, the second port for coupling with a communication line having multiple communication pathways, the test apparatus being controllable to test a second transport circuit in the communication network that is accessible via a second cross connect apparatus, wherein the second cross connect apparatus is accessible via the second port and a second communication line having a second quantity of equal bandwidth communication pathways that are dedicated for test access, the second communication line being coupled between the first cross connect apparatus and the second cross connect apparatus, wherein the second port is coupled to an input of the first communication circuit, and wherein at least one of the first quantity of equal bandwidth communication pathways is used by the second port and second communication circuit in connection with the testing of the second transport circuit.

17. The apparatus of claim 16, wherein the first port is a DS3 port.

18. The apparatus of claim 16, wherein the second port is a DS3 port.

19. The test apparatus of claim 16, further comprising a third communication circuit with a third communication port, the third port for coupling with a communication line having multiple communication pathways, the test apparatus being controllable to test a third transport circuit in the communication network that is accessible via a third cross connect apparatus, wherein the third cross connect apparatus is accessible via the third port and a third communication line having a third quantity of equal bandwidth communication pathways that are dedicated for test access, the third communication line being coupled between either the first cross connect apparatus or the second cross connect apparatus and the third cross connect apparatus, and wherein the third port is coupled to an input of the second communication circuit, and wherein at least one of the first quantity of equal bandwidth communication pathways is used by the third port and third communication circuit in connection with the testing of the third transport circuit.

20. The apparatus of claim 19, wherein the first port, the second port, and the third port are DS3 ports.

* * * * *